US012601142B2

(12) United States Patent
Moore

(10) Patent No.: US 12,601,142 B2
(45) Date of Patent: Apr. 14, 2026

(54) HYDRAULIC HAMMER WITH INTEGRATED OIL OR FLUID FILTER

(71) Applicant: Caterpillar Inc., Peoria, IL (US)

(72) Inventor: Cody T. Moore, Robinson, TX (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/899,147

(22) Filed: Sep. 27, 2024

(65) Prior Publication Data

US 2026/0092428 A1 Apr. 2, 2026

(51) Int. Cl.
*E02F 3/00* (2006.01)
*E02F 3/96* (2006.01)
*F15B 21/041* (2019.01)

(52) U.S. Cl.
CPC .............. *E02F 3/963* (2013.01); *E02F 3/966* (2013.01); *F15B 21/041* (2013.01)

(58) Field of Classification Search
CPC .......... E02F 9/963; E02F 9/966; F15B 21/041
See application file for complete search history.

(56) References Cited

U.S. PATENT DOCUMENTS 3,881,557 A * 5/1975 Gendron .................. E02D 7/10 173/DIG. 1
3,939,943 A * 2/1976 Salmi ........................ E21B 1/38 173/DIG. 3
4,174,010 A * 11/1979 Hibbard .................. F03C 1/007 173/78
4,265,321 A * 5/1981 Hibbard .................. E21B 21/01 173/78
4,553,610 A * 11/1985 Pelto-Huikko .... B23Q 11/0883 173/76
4,993,501 A * 2/1991 Zannini .............. B23Q 11/0883 173/76
9,724,813 B2 * 8/2017 Pettersson ................. E21B 1/38
2017/0157759 A1 * 6/2017 Moore ................... B25D 17/02
2021/0123217 A1 4/2021 Okumura et al.

FOREIGN PATENT DOCUMENTS

| | | | | | |
|---|---|---|---|---|---|
| AU | 631053 | B2 | | 11/1992 | |
| CN | 202789868 | U | | 3/2013 | |
| CN | 106948407 | A | | 7/2017 | |
| CN | 207145372 | U | | 3/2018 | |
| CN | 207685828 | U | | 8/2018 | |
| CN | 213610091 | U | * | 7/2021 | |
| CN | 115143168 | A | | 10/2022 | |
| CN | 218306623 | U | | 1/2023 | |
| EP | 3911833 | B1 | * | 8/2022 | E21B 21/015 |
| KR | 20180043749 | A | | 4/2018 | |

OTHER PUBLICATIONS

Written Opinion and International Search Report for Int'l. Patent Appln. No. PCT/US2025/043425, mailed Dec. 12, 2025 (14 pgs).

* cited by examiner

*Primary Examiner* — Eyamindae C Jallow

(57) ABSTRACT

A hydraulic hammer assembly includes a housing, a work tool, a fluid inlet, a fluid outlet, and a filter. The work tool is movable within the housing. The fluid inlet is configured to receive a hydraulic fluid for driving the work tool, and the fluid inlet is upstream of the work tool. The fluid outlet is for discharging the hydraulic fluid from the housing, and the fluid outlet is downstream of the work tool. The filter is positioned within the housing between the fluid inlet and the work tool.

20 Claims, 4 Drawing Sheets

HYDRAULIC HAMMER WITH INTEGRATED OIL OR FLUID FILTER

TECHNICAL FIELD

The present disclosure relates generally to a hydraulic hammer, and more particularly, to a hydraulic hammer with an integrated oil or fluid filter.

BACKGROUND

Hydraulic hammers can be attached to various machines, such as excavators, backhoes, tool carriers, or other like machines for the purpose of breaking stone, concrete and other construction materials. The hydraulic hammer is mounted to a boom of the machine and connected to a hydraulic system, for example, of the machine. The machine then supplies high pressure fluid to the hammer to drive a reciprocating piston and a work tool in contact with the piston.

Hydraulic hammers can be removably mounted to the machines, and, correspondingly, removably coupled to the hydraulic system of the machines. The hydraulic hammer can be physically mounted to the machine, and the hydraulic hammer can be fluidly connected to the hydraulic system of the machine via an intake or supply hydraulic hose and an outlet or return hose. Hydraulic hammers and the machines often operate in dusty, muddy, rocky, or otherwise dirty environments. The hydraulic hammers are often swapped on and off the machine, stored, or otherwise exposed to the environment. Dust, sand, mud, dirt, rocks, or other particulate or contaminants can interact with the hydraulic oil being suppled from the machine to the hydraulic hammer (e.g., via the intake or supply hydraulic hose), which can be susceptible to damage, or otherwise negatively affect the operation of the hydraulic hammer.

An exemplary hydraulic hammer is disclosed in U.S. Pat. No. 4,993,501 ("the '501 patent") to Gianfranco. The '501 patent discloses a hydraulic hammer for use in dusty, sandy, muddy, dirty, rocky, and/or corrosive environments. The '501 patent discloses that the hydraulic hammer includes at least one filter on an air intake duct to help prevent abrasive agents contained in the air that is being taken in by the hydraulic hammer. While the features described in the '501 patent may be useful to help protect a hydraulic hammer in some instances, the filter of the '501 patent does not prevent abrasive agents contained in hydraulic oil from entering the hydraulic hammer.

The techniques of this disclosure may solve one or more of the problems set forth above or other problems in the art. The scope of the current disclosure, however, is defined by the attached claims, and not by the ability to solve any specific problem.

SUMMARY

In one aspect, a hydraulic hammer assembly may include a housing, a work tool, a fluid inlet, a fluid outlet, and a filter. The work tool may be movable within the housing. The fluid inlet may be configured to receive a hydraulic fluid for driving the work tool, and the fluid inlet may be upstream of the work tool. The fluid outlet may be for discharging the hydraulic fluid from the housing, and the fluid outlet may be downstream of the work tool. The filter may be positioned within the housing between the fluid inlet and the work tool.

In another aspect, a hydraulic system may include a work machine and a hydraulic hammer. The work machine may include a source of pressurized hydraulic fluid. The hydraulic hammer may include a housing, a work tool, a fluid inlet, a fluid outlet, and a filter. The work tool may be movable within the housing. The fluid inlet may be configured to receive a hydraulic fluid from the source of pressurized hydraulic fluid for driving the work tool, and the fluid inlet may be upstream of the work tool. The fluid outlet may be for discharging the hydraulic fluid from the housing, and the fluid outlet may be downstream of the work tool. The filter may be positioned within the housing between the fluid inlet and the work tool.

In yet another aspect, a hydraulic hammer assembly includes a housing, a work tool, a fluid inlet, and a screen filter. The work tool may be movable within the housing. The fluid inlet may be configured to receive a fluid for driving the work tool, and the fluid inlet may be upstream of the work tool. The screen filter may be positioned within the housing between the fluid inlet and the work tool.

DETAILED DESCRIPTION

Both the foregoing general description and the following detailed description are exemplary and explanatory only and are not restrictive of the features, as claimed. As used herein, the terms "comprises," "comprising," "has," "having," "includes," "including," or other variations thereof, are intended to cover a non-exclusive inclusion such that a method or apparatus that comprises a list of elements does not include only those elements, but may include other elements not expressly listed or inherent to such a method or apparatus. In this disclosure, relative terms, such as, for example, "about," "substantially," "generally," and "approximately" are used to indicate a possible variation of +10% in the stated value or characteristic. The term "or" is used disjunctively, such that "at least one of A or B" includes, (A), (B), (A and A), (A and B), (B and B), etc.

Figure 1:
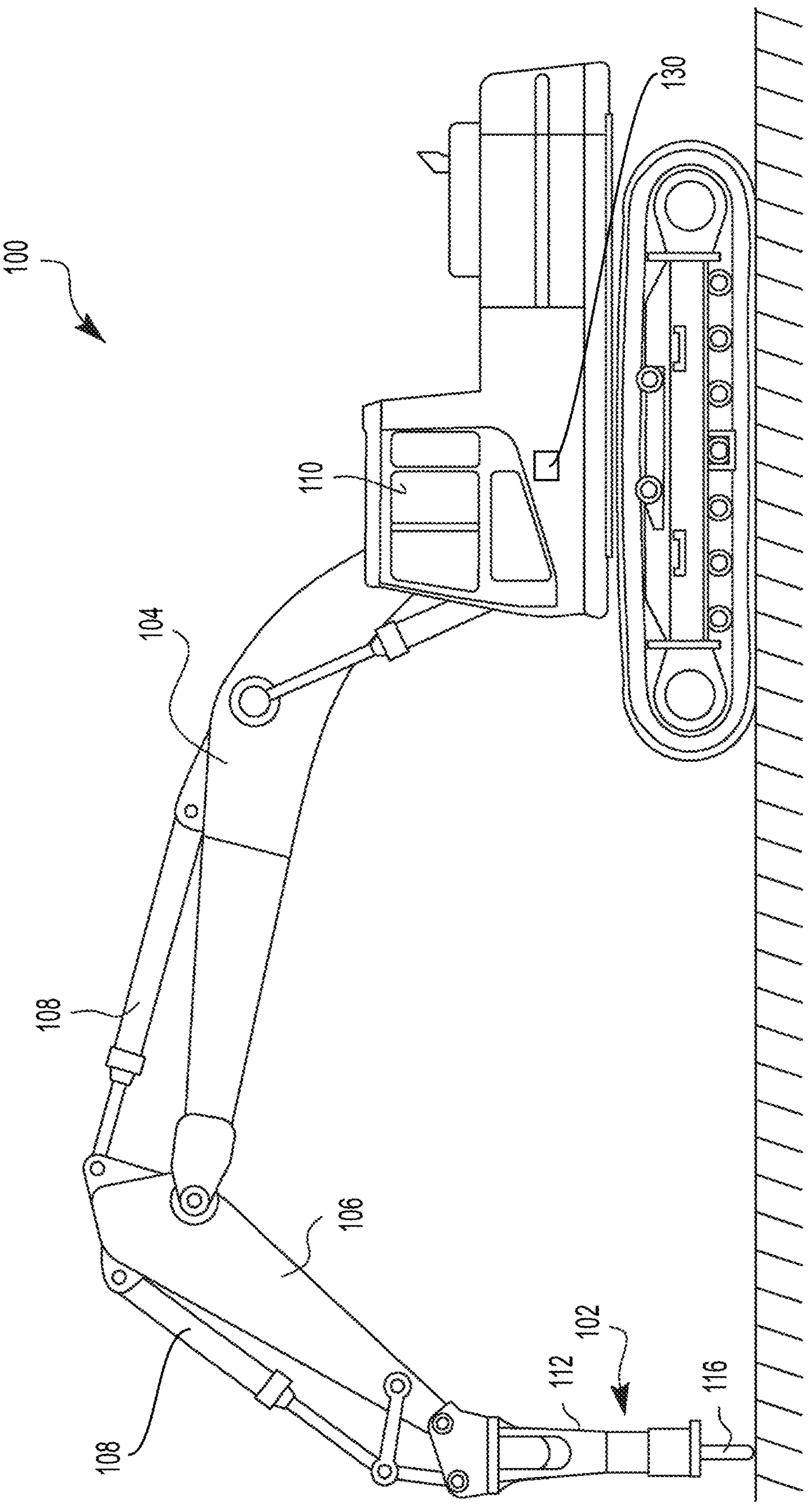
FIG. 1 illustrates a schematic diagram of a work assembly, including a work machine and a hydraulic hammer, according to aspects of this disclosure.
Figure 2:
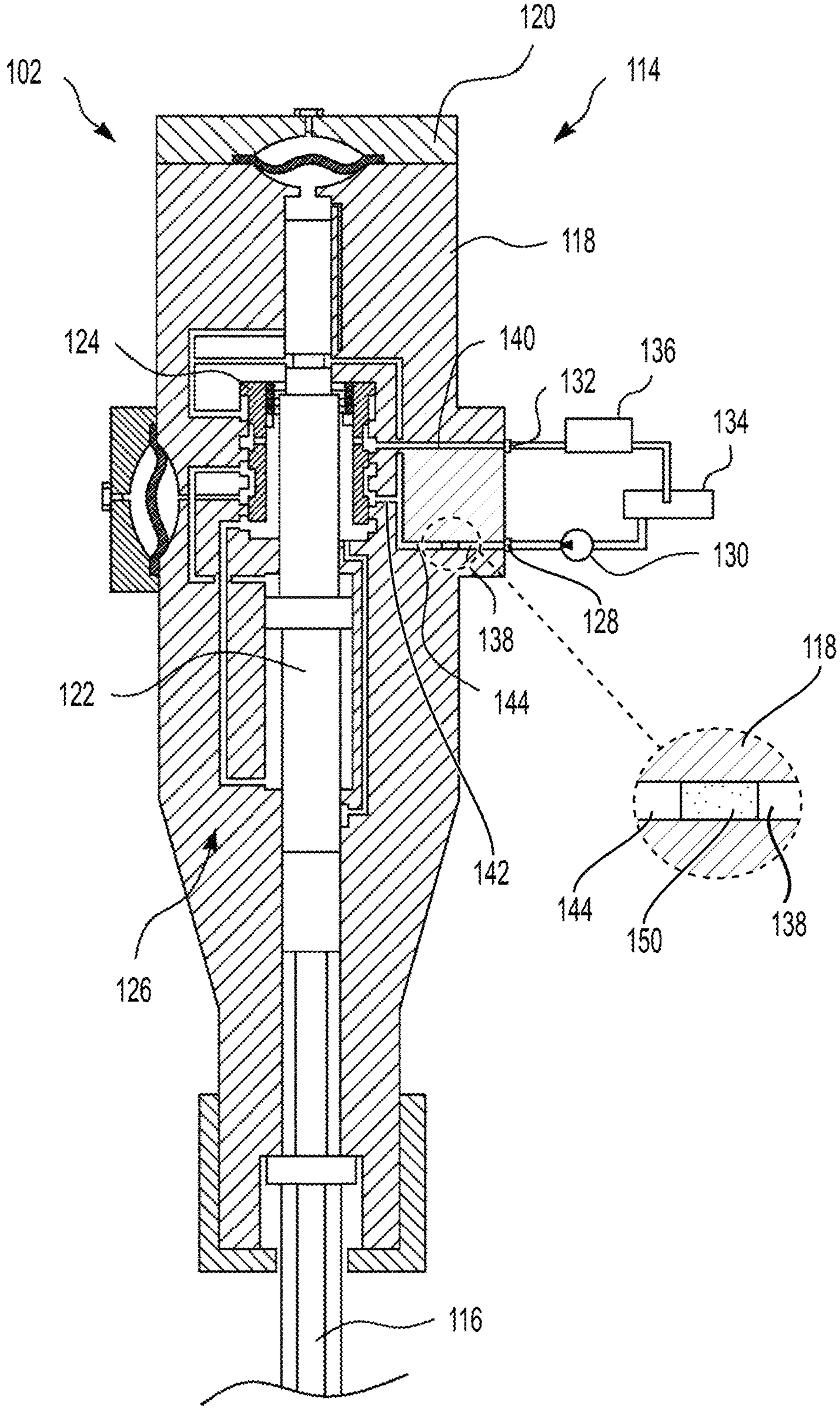
FIG. 2 illustrates a schematic cutaway view of a hammer coupled to a hydraulic system of the work machine.
Figure 3:
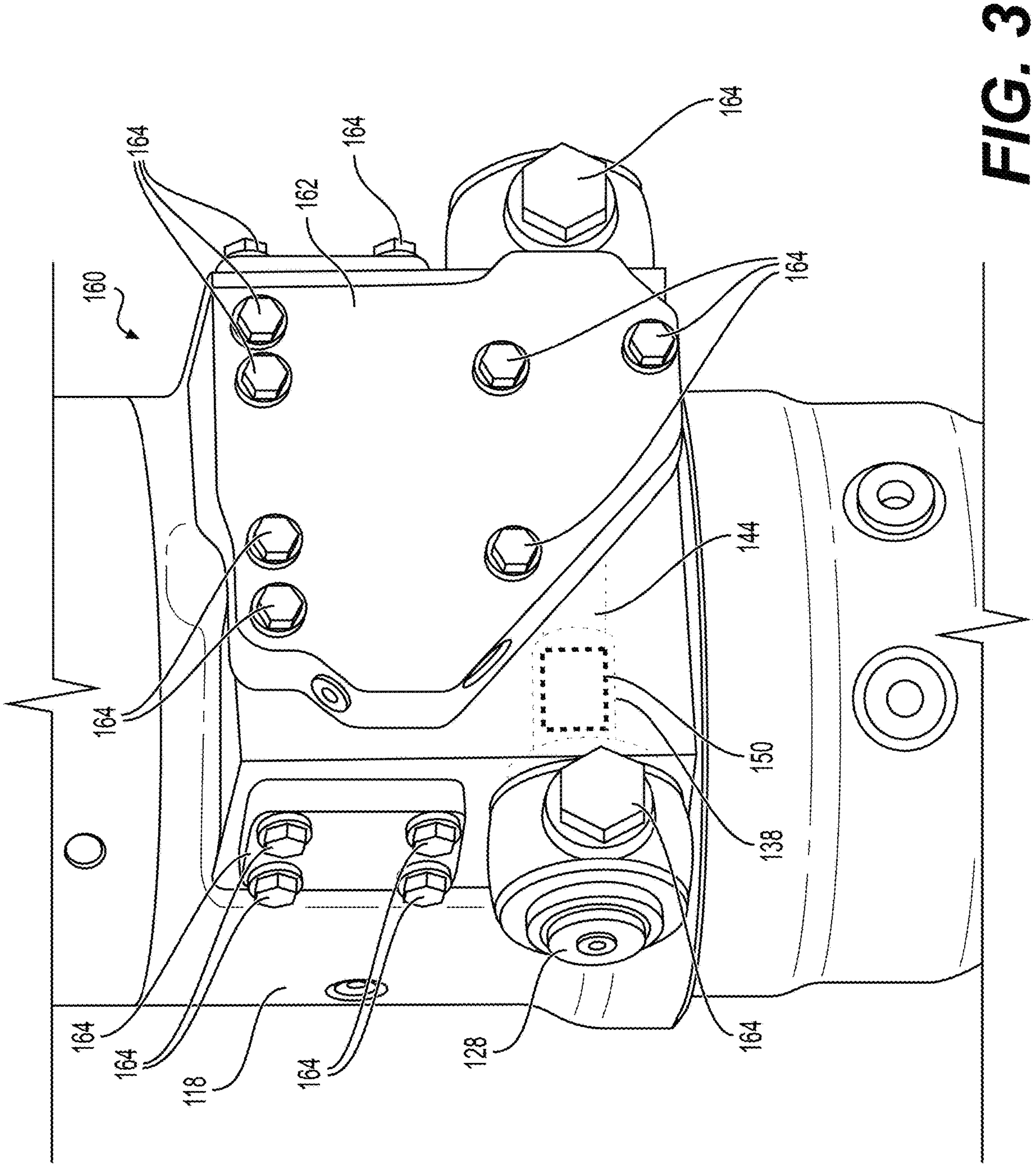
FIG. 3 is perspective view of a portion of a hydraulic hammer assembly, with some components shown as transparent.
Figure 4:
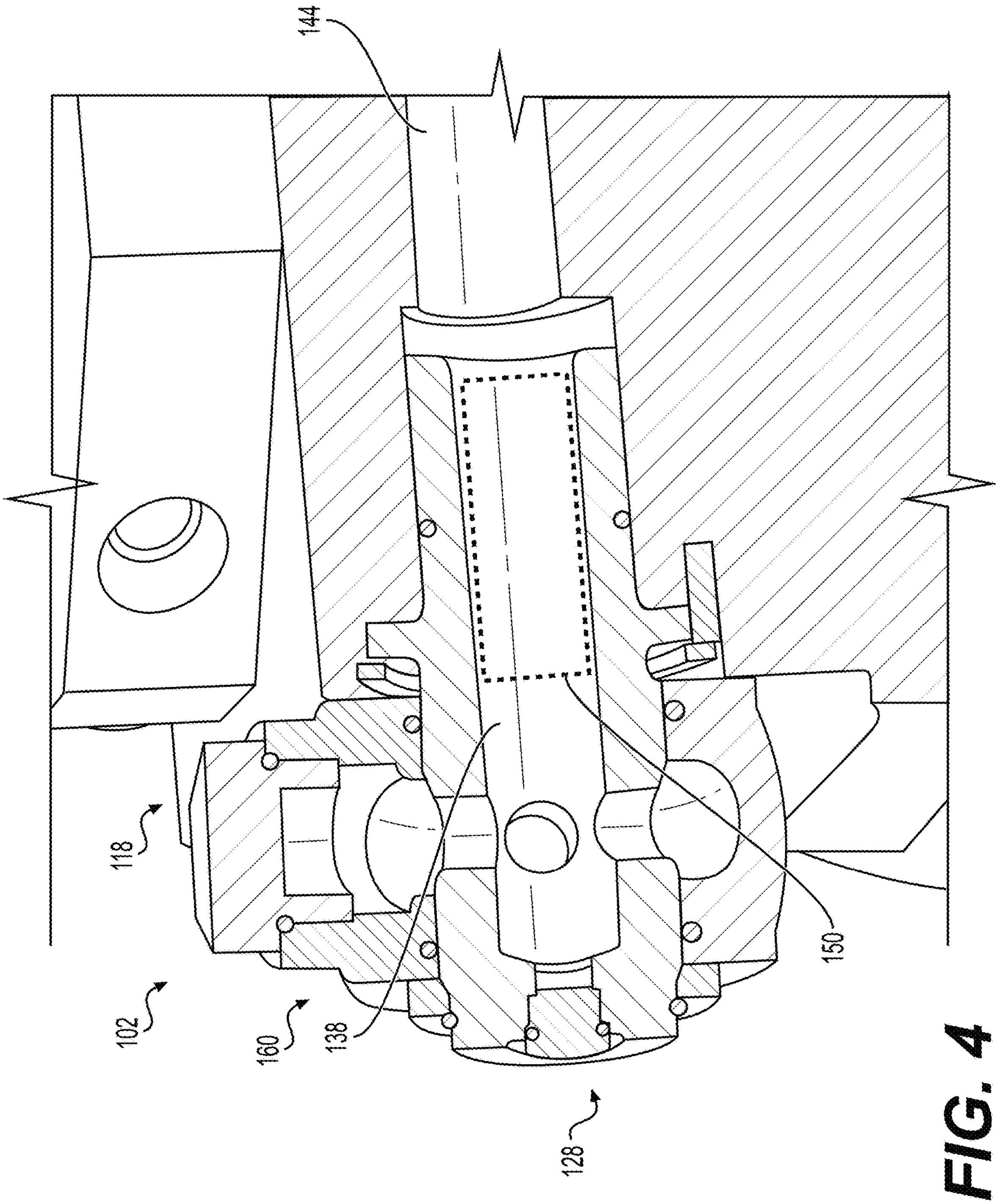
FIG. 4 is cross-sectional view of another portion of the hydraulic hammer assembly.

FIG. 1 illustrates an exemplary work machine 100 that may incorporate or be coupled to a hydraulic hammer, hereinafter referred to as a hammer 102. Work machine 100 may be configured to perform work associated with a particular industry such as, for example, mining or construction. For example, work machine 100 may be a backhoe loader, an excavator (shown in FIG. 1), a skid steer loader, or any other machine. Hammer 102 may be connected to the work machine 100 through a boom 104 and/or an arm 106. It is contemplated that other linkage arrangements known in the art to connect hammer 102 to work machine 100 may alternatively be utilized. Additionally, as discussed in detail below, hammer 102 may receive fluid (e.g., hydraulic oil or hydraulic fluid), for example, from work machine 100, to drive the movement of hammer 102. For example, work machine 100 may include one or more sources or supplies of pressurized fluid 130 (e.g., via a fluid pump). Although not shown in FIG. 1, source of pressurized fluid 130 may be fluidly connected to hammer 102, for example, via one or more hydraulic lines, hoses, etc. In these aspects, hammer 102 may be in fluid communication with work machine 100, such that hammer 102 receives fluid from work machine 100 and also discharges fluid back to work machine 100, e.g., to form a fluid circuit. Additionally, in some aspects, hammer 102 includes one or more filters (e.g., a filter 150, as shown in FIGS. 2-4), for example, oil or fluid filters. As will be explained in more detail below, the one or more filters 150 are integrated within hydraulic hammer 102 and may be positioned between an inlet (e.g., a fluid inlet 128, FIG. 2) and a hammer assembly (e.g., hammer 102 and an actuator assembly 112, FIG. 2).

As shown in FIG. 1, one or more hydraulic cylinders 108 may raise, lower, and/or swing boom 104 or arm 106 to correspondingly raise, lower, and/or swing hammer 102. Hydraulic cylinders 108 may be connected to a hydraulic supply system within the work machine 100. Specifically, work machine 100 may include a hydraulic pump (e.g., source of pressurized fluid 130) connected to hydraulic cylinders 108 or hammer 102, for example, through one or more hydraulic supply lines. The hydraulic supply system may introduce pressurized fluid, for example oil, from the pump and into hydraulic cylinders 108. Operator controls for movement of hydraulic cylinders 108 or hammer 102 may be located within a cabin 110 of work machine 100.

Hammer 102 may include an outer shell 112 and actuator assembly 114 (shown in FIG. 2) located within outer shell 112. A work tool 116 may be operatively connected to an end of actuator assembly 114 opposite to arm 106. It is understood that work tool 116 may include any known tool capable of use with hammer 102. In some aspects, work tool 116 includes a chisel bit.

FIG. 2 illustrates a cross-sectional view of hammer 102. As shown in FIG. 2, actuator assembly 114 may include, among other things, a housing 118 and a head 120. Housing 118 may be a hollow cylindrical body, and head 120 may cap off one end of housing 118. Actuator assembly 114 may further include, among other components, a piston 122, a distribution valve 124, or a hydraulic circuit 126, for example, disposed in housing 118 for actuating (e.g., reciprocating) piston 122 inside housing 118. Piston 122 may be configured to reciprocate within both housing 118 and head 120 during operation of hammer 102.

Still referring to FIG. 2, hammer 102 may include fluid inlet 128 for receiving pressurized fluid from source of pressurized fluid 130. As mentioned, source of pressurized fluid 130 may be, for example, a hydraulic pump. In some aspects, the hydraulic pump may be part of work machine 100, as discussed above with respect to FIG. 1. Furthermore, hammer 102 may include a fluid outlet 132, for example, for returning fluid to a source of hydraulic fluid (e.g., source of pressurized fluid 130) or a reservoir 134. Reservoir 134 may be a part of work machine 100. Work machine 100 (or another portion of the hydraulic circuit) may include a cooling system 136 for cooling the hydraulic fluid. Cooling system 136 may be disposed between fluid outlet 132 and reservoir 134.

Further, housing 118 may define an inlet passage 138 for receiving pressurized fluid from fluid inlet 128 and supplying the fluid to hydraulic circuit 126. An outlet passage 140 defined in housing 118 may receive the fluid from hydraulic circuit 126 and pass the fluid to reservoir 134 via fluid outlet 132. Inlet passage 138 and outlet passage 140 may be part of hydraulic circuit 126. Additionally, it is noted that although various aspects of this disclosure discuss various portions of hydraulic circuit 126 being passages in housing

118, this disclosure is not so limited. For example, in some aspects, various aspects of portions of hydraulic circuit 126 may be formed by one or more tube(s), hose(s), pipe(s), valve(s), or other fluidic conduits or connections.

Additionally, as shown in FIG. 2, one or more filters 150 are integrated within hydraulic hammer 102. For example, filter 150 may be positioned within inlet passage 138, for example, positioned between a fluid intake and the movable hammer assembly. Filter 150 may be positioned within inlet passage 138, for example, between fluid inlet 128 and an actuator inlet 142. For example, a filtered fluid passage 144 may be a part of inlet passage 138 and may extend from filter(s) 150 to actuator inlet 142, piston 122, work tool 116, and the other movable or hydraulic components of hammer 102. Filter 150 may be integrated within inlet passage 138 or may otherwise be positioned (e.g., fixedly positioned) within a portion of inlet passage 138, for example, spanning a portion or length of inlet passage 138. Additionally, filter 150 may be include a complementary size or shape to an inner size or shape of inlet passage 138. For example, filter 150 may be generally cylindrical in shape, and may include a diameter of approximately 25 mm to approximately 50 mm. In these aspects, all fluid (e.g., hydraulic fluid) passing through inlet passage 138 (e.g., from fluid inlet 128 and to actuator inlet 142) passes through filter 150.

Filter 150 may be configured to filter various materials or particles from the hydraulic fluid delivered to hammer 102, for example, from work machine 100. In some aspects, filter 150 is a screen-type filter, for example, a stainless steel screen-type filter. In other aspects, filter 150 may be formed of paper, fiberglass, or another appropriate material. Furthermore, in some aspects, filter 150 includes a plurality of filters, for example, arranged in series. In that aspect, the plurality of filters may be the same size, or may be of different sizes, for example, with openings of decreasing size from an upstream filter to a downstream filter. In some other aspects, if hammer 102 includes a plurality of inlet passages 138 (e.g., arranged in parallel), then hammer 102 may also include a plurality of filters 150, for example, with one or more filters 150 arranged in each of the inlet passages 138.

Filter 150 may be configured to filter (e.g., block, stop, retain, remove, etc.) particles that are approximately 25 microns (0.025 mm) or larger. In some aspects, filter 150 may be configured to filter particles that are approximately 50 microns (0.05 mm) or larger. Additionally, the size and/or shape of filter 150 may depend on the size, type, model, etc. of hammer 102, work tool 116, etc.

FIG. 3 is a perspective and partially transparent view of a portion of hammer 102, for example, of a portion of housing 118, fluid inlet 128, and filter 150 (shown in dashed lines). FIG. 4 is a cross-sectional view of a portion of hammer 102, including housing 118, fluid inlet 128, and filter 150. Referring to both FIGS. 3 and 4 and as mentioned above, inlet passage 138 includes one or more filters 150 positioned therein. For example, filter 150 may be positioned within inlet passage 138, for example, between fluid inlet 128 and an actuator inlet 142. Additionally, as mentioned above, filtered fluid passage 144 may be a part of inlet passage 138 and may extend (e.g., downstream) from filter(s) 150 to other portions of hammer 102 (e.g., actuator inlet 142, piston 122, work tool 116, and the other movable or hydraulic components).

In some aspects, as shown in FIGS. 3 and 4, housing 118 of hammer 102 may include a fluid connection compartment 160. Compartment 160 may be a box (e.g., a steel box). Compartment 160 may be removably coupled to housing 118, for example, openable to access one or more portions of housing 118. Compartment 160 may include one or more panels 162, which may be coupled to housing 118 via one or more coupling elements 164 (e.g., nuts, bolts, screws, etc.). For example, coupling elements 164 may be loosened or otherwise unsecured to separate panel(s) 162 from housing 118. In these aspects, compartment 160 may be openable to provide access to inlet passage 138, for example, in order to access, replace, clean, service, or otherwise inspect filter 150. In these aspects, filter 150 may be accessed, replaced, cleaned, serviced, or otherwise inspected at the same time and/or frequency as when hammer 102 is serviced (e.g., every 1-2 years). In some aspects, filter 150 may be positioned within, adjacent to, or in proximity of one or more fittings, for example, for checking system pressure.

INDUSTRIAL APPLICABILITY

The disclosed aspects of hammer 102 and filter 150 may be used in any hydraulic hammer that is selectively coupled to a work machine (e.g., work machine 100) and that also receives fluid from the work machine. As discussed above, filter 150 may be internal to hammer 102 or otherwise integrated into hammer 102. Furthermore, filter 150 is positioned within inlet passage 138, for example, between fluid inlet 128 and actuator assembly 114, that is, upstream or on the supply side of work tool 116. Additionally, filter 150 may be a screen-type filter (e.g., a screen filter), for example, a stainless steel screen-type filter (e.g., a stainless steel screen filter), and filter 150 may be configured to filter out particles from the received fluid. In some aspects, filter 150 filters out particles that are approximately 25 microns or larger. In some aspects, filter 150 filters out particles that are approximately 50 microns or larger.

In these aspects, filter 150 may help to prevent particles from damaging or otherwise affecting the performance of hammer 102. It is noted that work machines often include their own filters (e.g., upstream of the source of pressurized fluid 130, downstream of fluid outlet 132 or cooling system 136, etc.), in order to protect the hydraulic system of the work machines. However, hammer 102 may be coupled and uncoupled from work machines multiple times a work site. Dust, sand, mud, dirt, rocks, or other particulates or contaminants may enter inlet passage 138 or the tubes, hoses, or other fluidic or hydraulic coupling components of work machine 100, for example, when hammer 102 is uncoupled from work machine 100. In these aspects, filter 150 may help to filter out the dust, sand, mud, dirt, rocks, or other particulates or contaminants in order to help reduce a chance that the fluid passing into actuator assembly 114 includes the particulates or contaminants. In these aspects, filter(s) 150 may help to protect the operation, durability, lifespan, etc. of hammer 102. Additionally, because filter 150 is integrated into or otherwise a part of hammer 102, filter 150 may help to ensure that all fluid passing through hammer 102 (e.g., into actuator assembly 114 to drive work tool 116) is substantially free of particulates or contaminants.

It will be apparent to those skilled in the art that various modifications and variations can be made to the disclosed system without departing from the scope of the disclosure. Other embodiments of the system will be apparent to those skilled in the art from consideration of the specification and practice of the hydraulic hammer with an integrated oil or fluid filter disclosed herein. It is intended that the specification and examples be considered as exemplary only, with a true scope of the disclosure being indicated by the following claims and their equivalents.

What is claimed is:

1. A hydraulic hammer assembly, comprising:
a housing;
a work tool, wherein the work tool is movable within the housing;
a fluid inlet configured to receive a hydraulic fluid for driving the work tool, wherein the fluid inlet is upstream of the work tool;
a fluid outlet for discharging the hydraulic fluid from the housing, wherein the fluid outlet is downstream of the work tool; and
a filter, wherein the housing defines an inlet passage between the fluid inlet and the work tool, wherein the filter is positioned within the housing inlet passage between the fluid inlet and the work tool, such that hydraulic fluid flows from the fluid inlet, through the filter, and to the work tool.

2. The hydraulic hammer assembly of claim 1, further comprising a fluid connection compartment on the housing, wherein the fluid connection compartment includes the fluid inlet, at least a portion of the inlet passage, and the filter.

3. The hydraulic hammer assembly of claim 2, wherein the fluid connection compartment includes one or more panels that are removably from the housing to provide access to at least a portion of the inlet passage and the filter.

4. The hydraulic hammer assembly of claim 1, wherein the filter is a screen filter.

5. The hydraulic hammer assembly of claim 4, wherein the filter is a stainless steel screen filter.

6. The hydraulic hammer assembly of claim 1, wherein the filter is formed of paper or fiberglass.

7. The hydraulic hammer assembly of claim 1, wherein the filter includes a plurality of filters.

8. A hydraulic system, comprising:
a work machine, wherein the work machine includes a source of a pressurized hydraulic fluid; and
a hydraulic hammer, wherein the hydraulic hammer includes:
a housing;
a work tool, wherein the work tool is movable within the housing;
a fluid inlet configured to receive a hydraulic fluid from the source of pressurized hydraulic fluid for driving the work tool, wherein the fluid inlet is upstream of the work tool;
a fluid outlet for discharging the hydraulic fluid from the housing, wherein the fluid outlet is downstream of the work tool;
a filter, wherein the housing defines an inlet passage between the fluid inlet and the work tool, wherein the filter is positioned within the inlet passage between the fluid inlet and the work tool; and
a fluid connection compartment on the housing, wherein the fluid connection compartment includes the fluid inlet, at least a portion of the inlet passage, and the filter.

9. The hydraulic system of claim 8, wherein the filter is a screen filter.

10. The hydraulic system of claim 8, wherein the filter is a stainless steel screen filter.

11. The hydraulic system of claim 8, wherein the filter is formed of paper or fiberglass.

12. The hydraulic system of claim 8, wherein the work machine is an excavator, and wherein the hydraulic hammer is coupled to an arm of the excavator.

13. The hydraulic system of claim 8, wherein the filter is positioned within an inlet passage that is fluidly connected to the fluid inlet.

14. The hydraulic system of claim 8 wherein the fluid connection compartment includes one or more panels that are removably from the housing to provide access to at least a portion of the inlet passage and the filter.

15. The hydraulic system of claim 8, wherein the filter is positioned within the inlet passage between the fluid inlet and the work tool, such that hydraulic fluid flows from the fluid inlet, through the filter, and to the work tool.

16. A hydraulic hammer assembly, comprising:

a housing;

a work tool, wherein the work tool is movable within the housing;

a fluid inlet configured to receive a fluid for driving the work tool, wherein the fluid inlet is upstream of the work tool;

a screen filter, wherein the screen filter is positioned between the fluid inlet and the work tool such that hydraulic fluid delivered via the fluid inlet flows through the screen filter and to the work tool; and a fluid connection compartment on the housing, wherein the fluid connection compartment includes the fluid inlet and the screen filter.

17. The hydraulic hammer assembly of claim 16, wherein the screen filter is a stainless steel filter.

18. The hydraulic hammer assembly of claim 16, wherein the screen filter is positioned within an inlet passage formed in a portion of the housing that is fluidly connected to the fluid inlet.

19. The hydraulic hammer assembly of claim 18, wherein the fluid connection compartment includes the fluid inlet, at least a portion of the inlet passage, and the screen filter.

20. The hydraulic hammer assembly of claim 19, wherein the fluid connection compartment includes one or more panels that are removably from the housing to provide access to at least a portion of the inlet passage and the screen filter.

* * * * *